(12) United States Patent
Kroll et al.

(10) Patent No.: US 11,009,385 B2
(45) Date of Patent: May 18, 2021

(54) PORTABLE, ELECTRONIC WEIGH SCALE SYSTEM

(71) Applicant: Intercomp Company, Medina, MN (US)

(72) Inventors: William P. Kroll, Medina, MN (US); Randie Evenson, Blaine, MN (US)

(73) Assignee: Intercomp Company, Medina, MN (US)

( * ) Notice: Subject to any disclaimer, the term of this patent is extended or adjusted under 35 U.S.C. 154(b) by 0 days.

(21) Appl. No.: 16/409,302

(22) Filed: May 10, 2019

(65) Prior Publication Data

US 2019/0346303 A1    Nov. 14, 2019

Related U.S. Application Data

(60) Provisional application No. 62/669,590, filed on May 10, 2018.

(51) Int. Cl.
*G01G 21/23* (2006.01)
*G01G 19/02* (2006.01)

(52) U.S. Cl.
CPC ........... *G01G 19/027* (2013.01); *G01G 21/23* (2013.01)

(58) Field of Classification Search
CPC .............................. G01G 19/027; G01G 21/23
USPC ........................................................ 177/244
See application file for complete search history.

(56) References Cited

U.S. PATENT DOCUMENTS

| | | | | |
|---|---|---|---|---|
| 5,232,064 A * | 8/1993 | Kroll | .................... | G01G 19/025 177/211 |
| 7,119,287 B2 * | 10/2006 | Kroll | .................... | G01G 19/027 177/132 |
| 8,080,742 B2 * | 12/2011 | Bergan | ................. | G01G 19/022 177/132 |
| 2015/0226598 A1 * | 8/2015 | Lawn | .................... | G01G 19/021 177/1 |
| 2017/0030764 A1 * | 2/2017 | Lawn | .................... | G01G 19/021 |

* cited by examiner

*Primary Examiner* — Jacques M Saint Surin
(74) *Attorney, Agent, or Firm* — Skinner and Associates; Joel D. Skinner, Jr.

(57) ABSTRACT

A compact, self-contained, portable, electronic weigh scale for use for commercial vehicle weight enforcement. The scale has a base, a set of load cells, and a platform. The base is rigid, metallic, and generally rectangular, and has a central recessed area. The load cells are elongated, rectangular, and are coupled to the base in the central recessed area. The load cells are arranged parallel to each other. Each load celli has a long axis and a short axis, each load cell being fixedly coupled to the base at two side-by-side lateral points at a first longitudinal position relative to a bottom side of the load ceil and fixedly coupled to the base at two side-by-side lateral points at at least one other longitudinal position relative to the bottom side of the load ceil. The platform is rigid, metallic, rectangular. The platform is coupled to each load cell, the load cells being fixedly coupled at a second longitudinal position relative to a top side of the load cell and fixedly coupled to the platform at at least one other longitudinal position relative to the top side of the load cells.

13 Claims, 16 Drawing Sheets

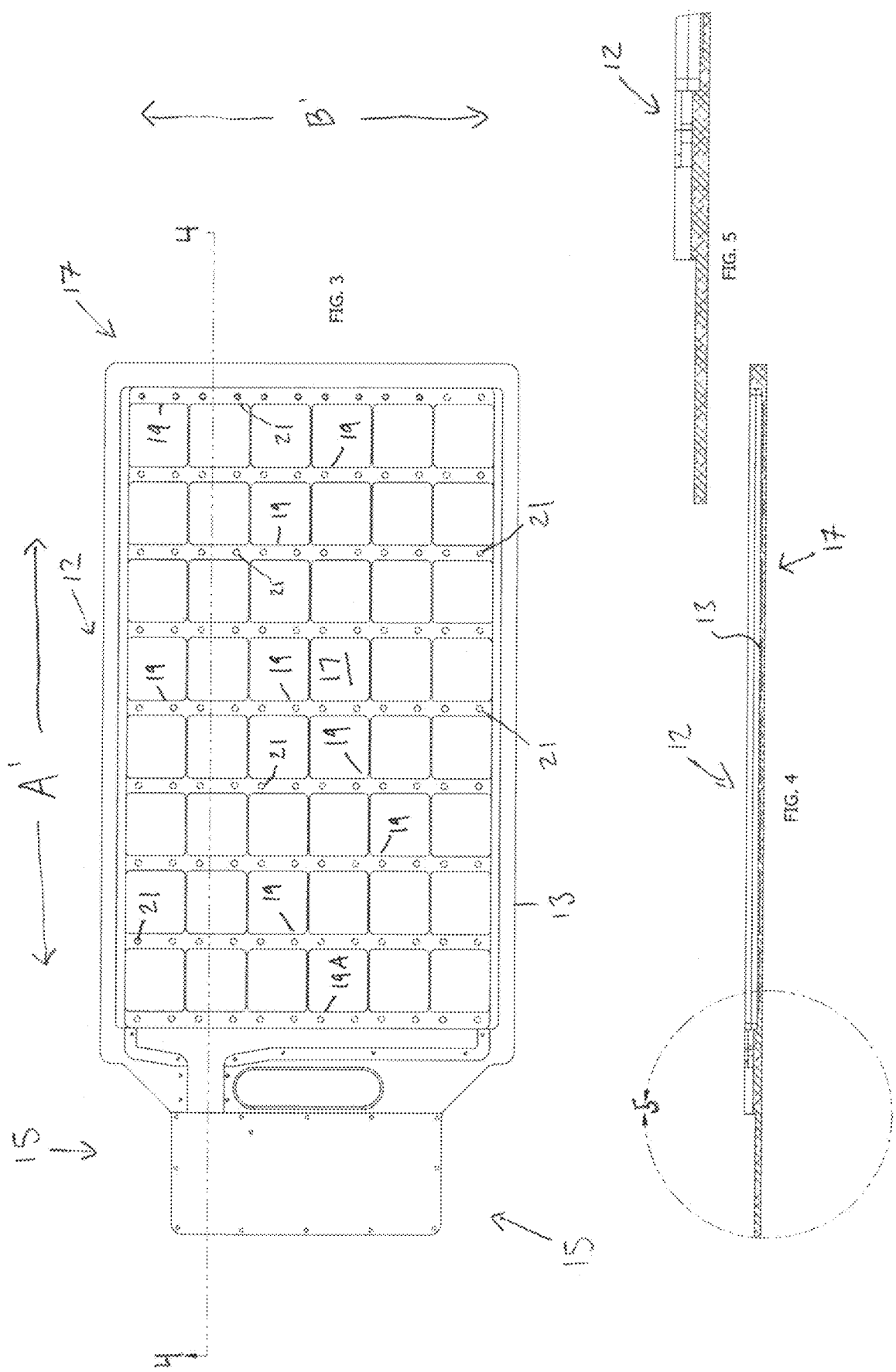

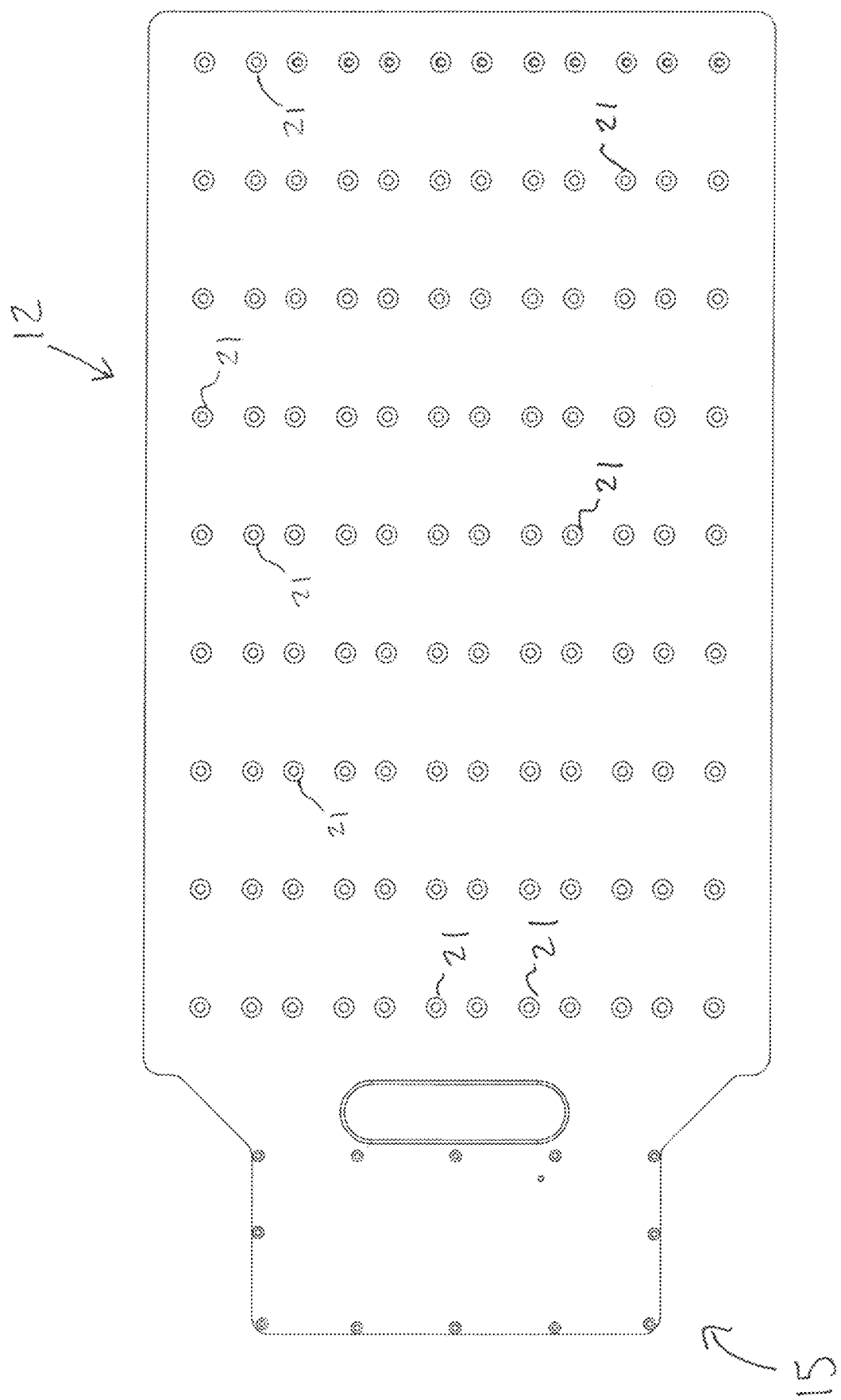

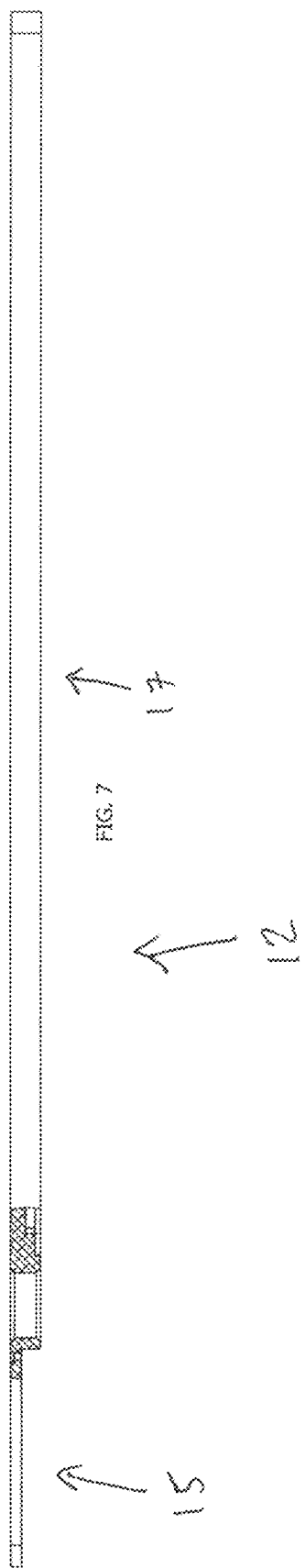

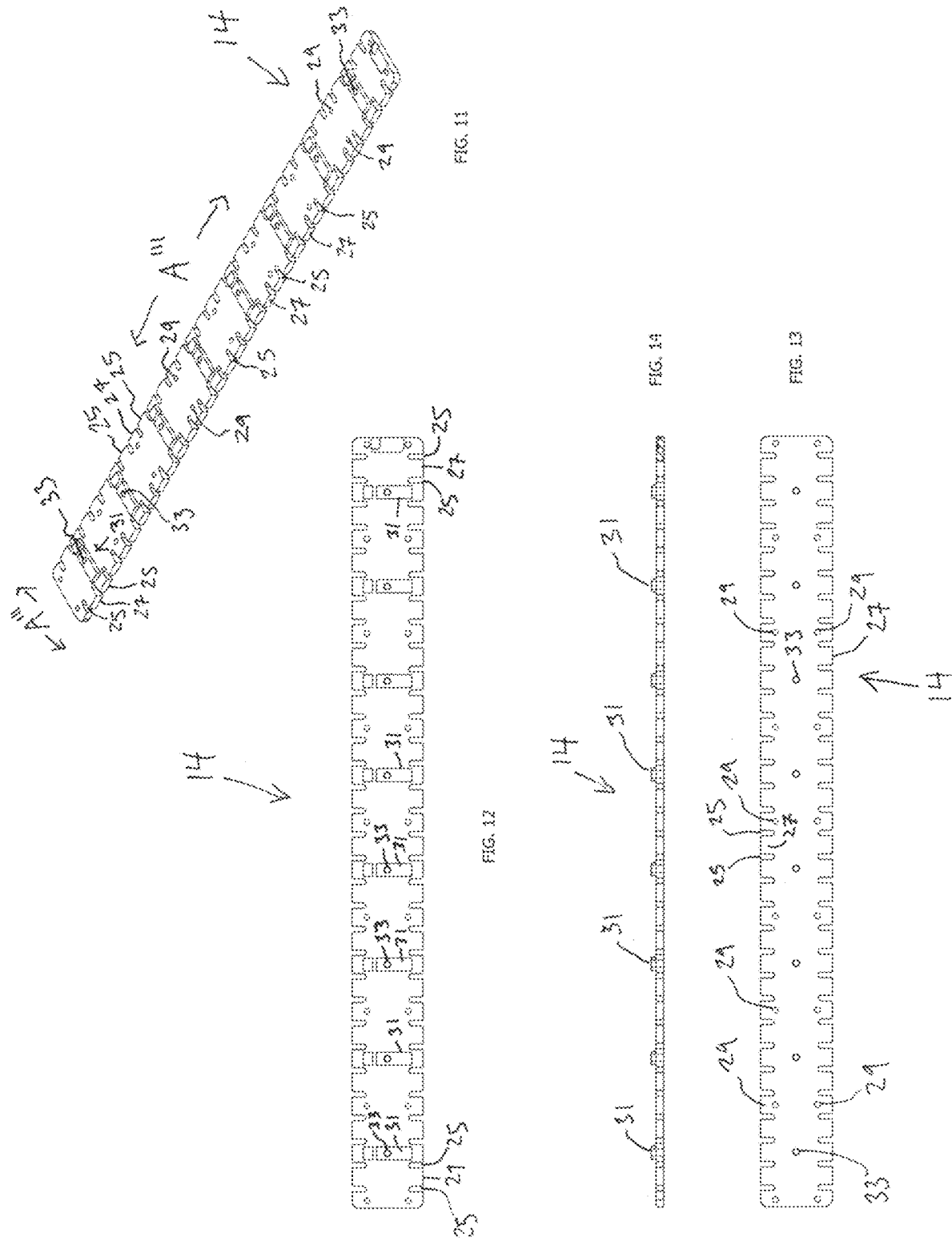

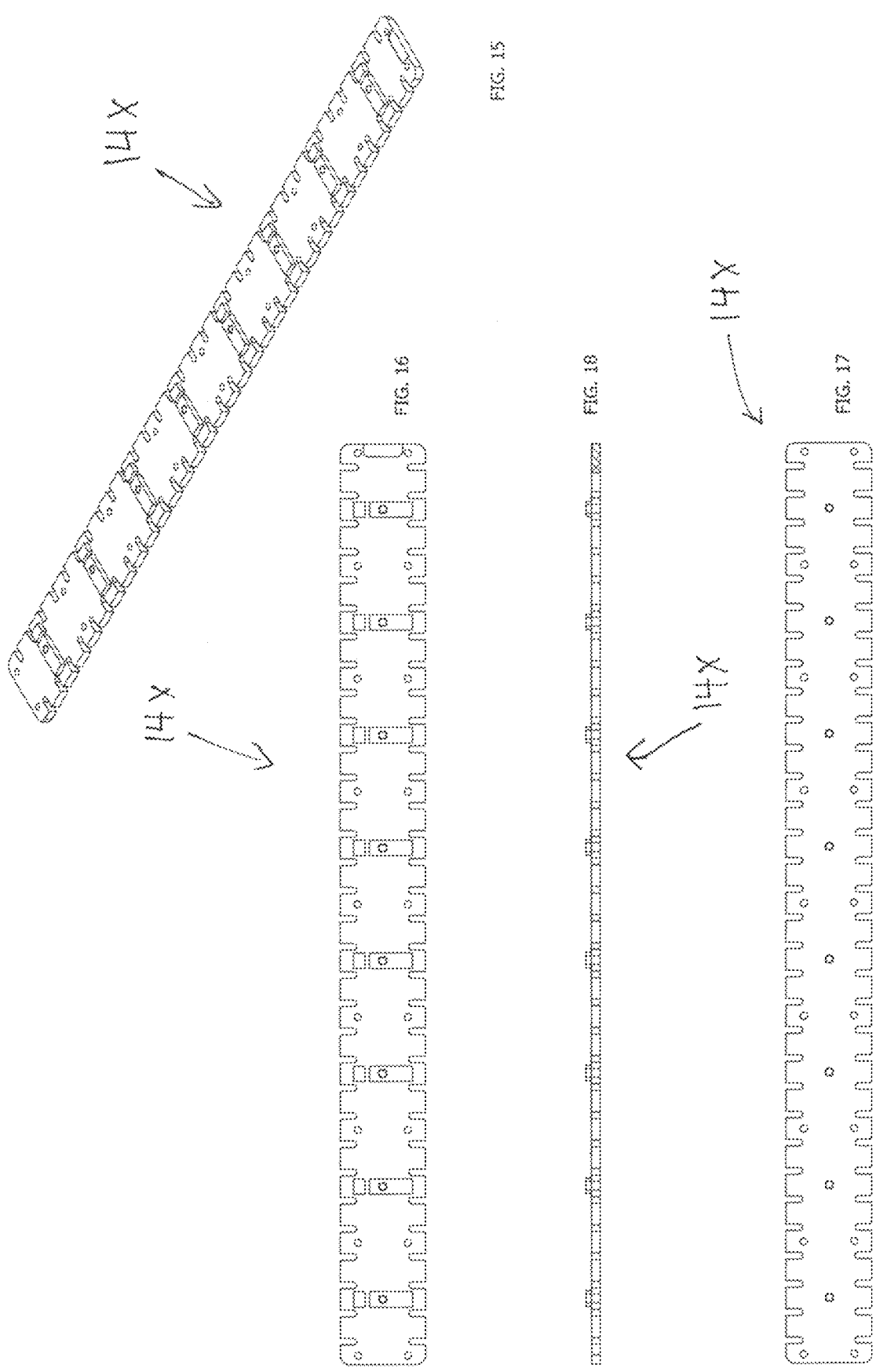

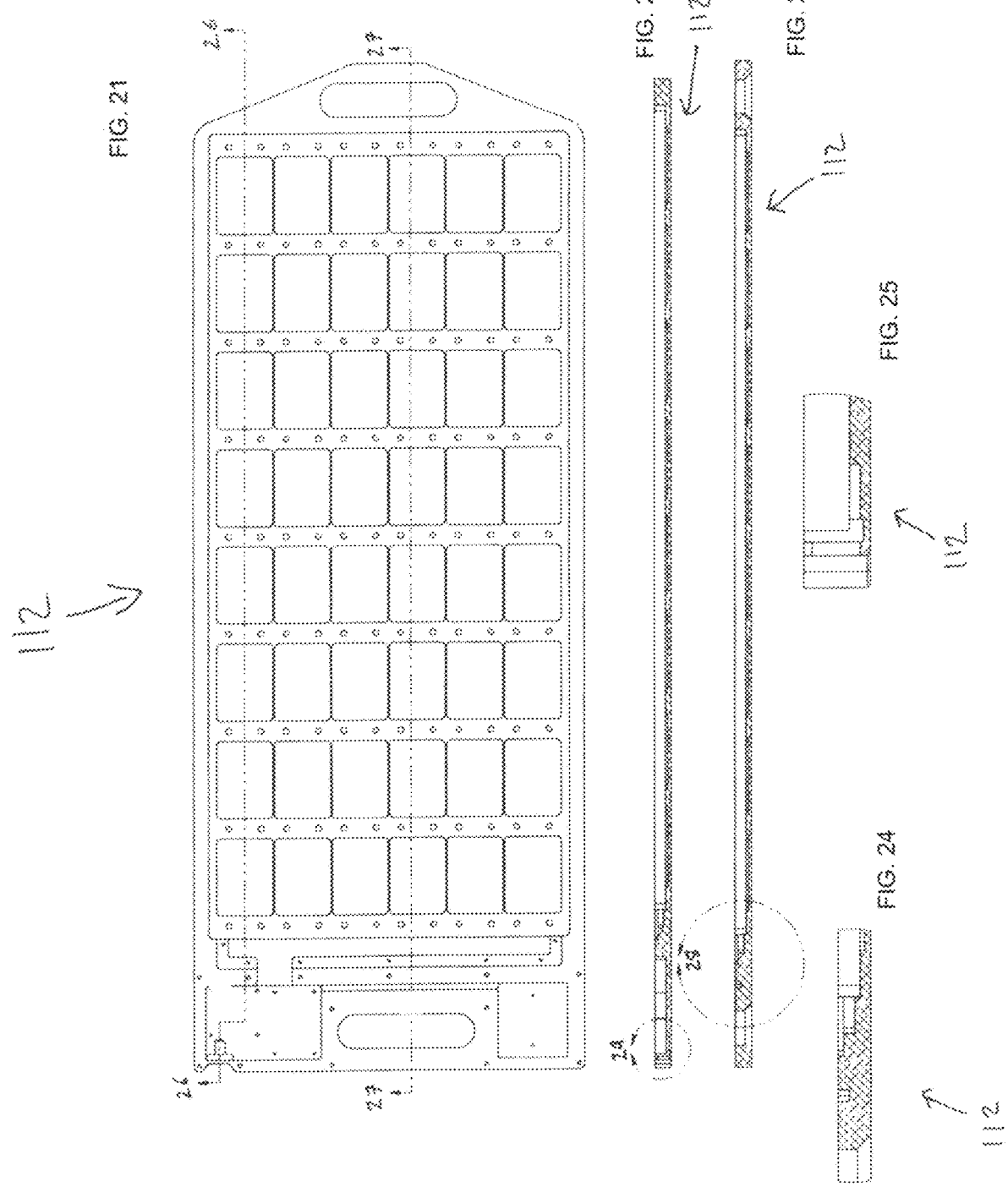

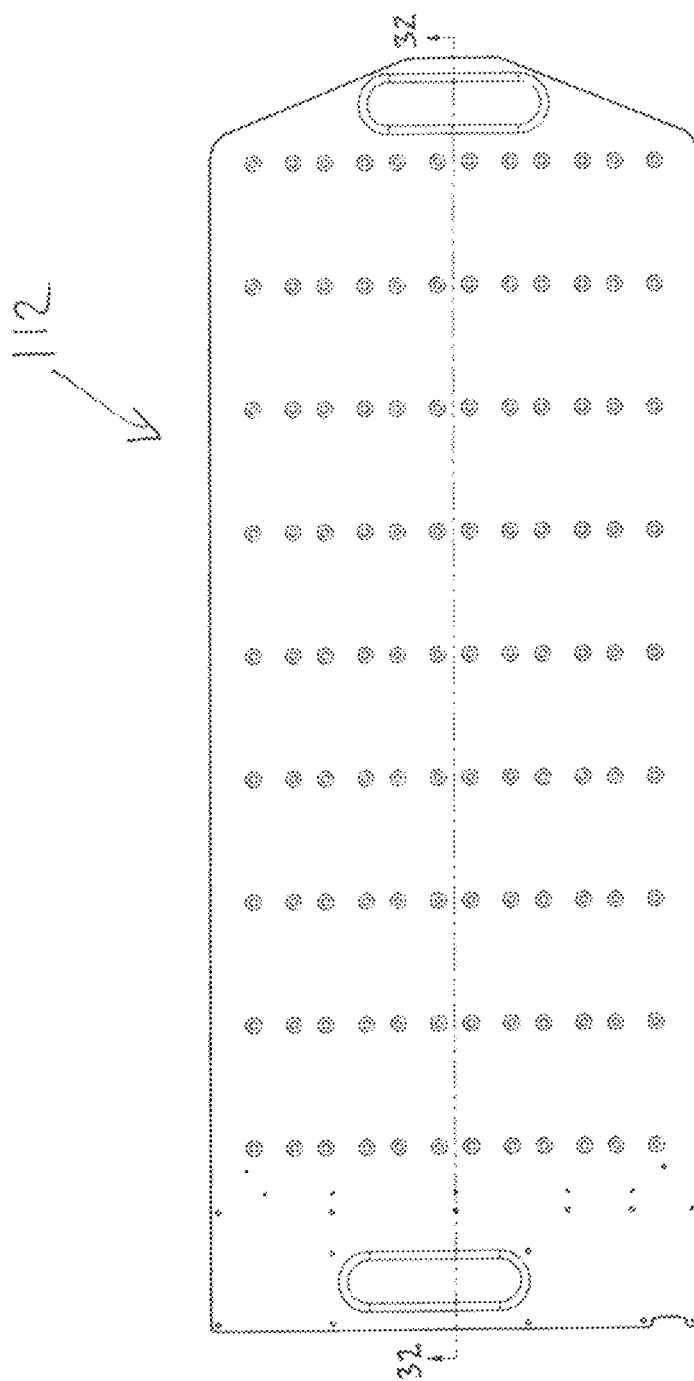
FIG. 26
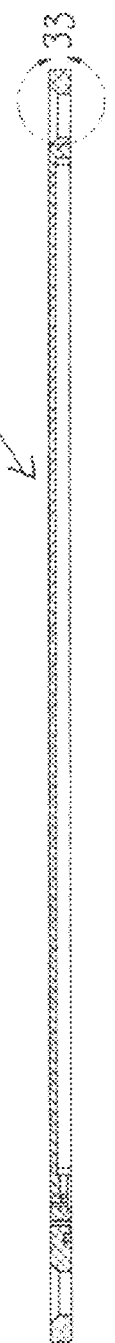
FIG. 28
FIG. 29
FIG. 27

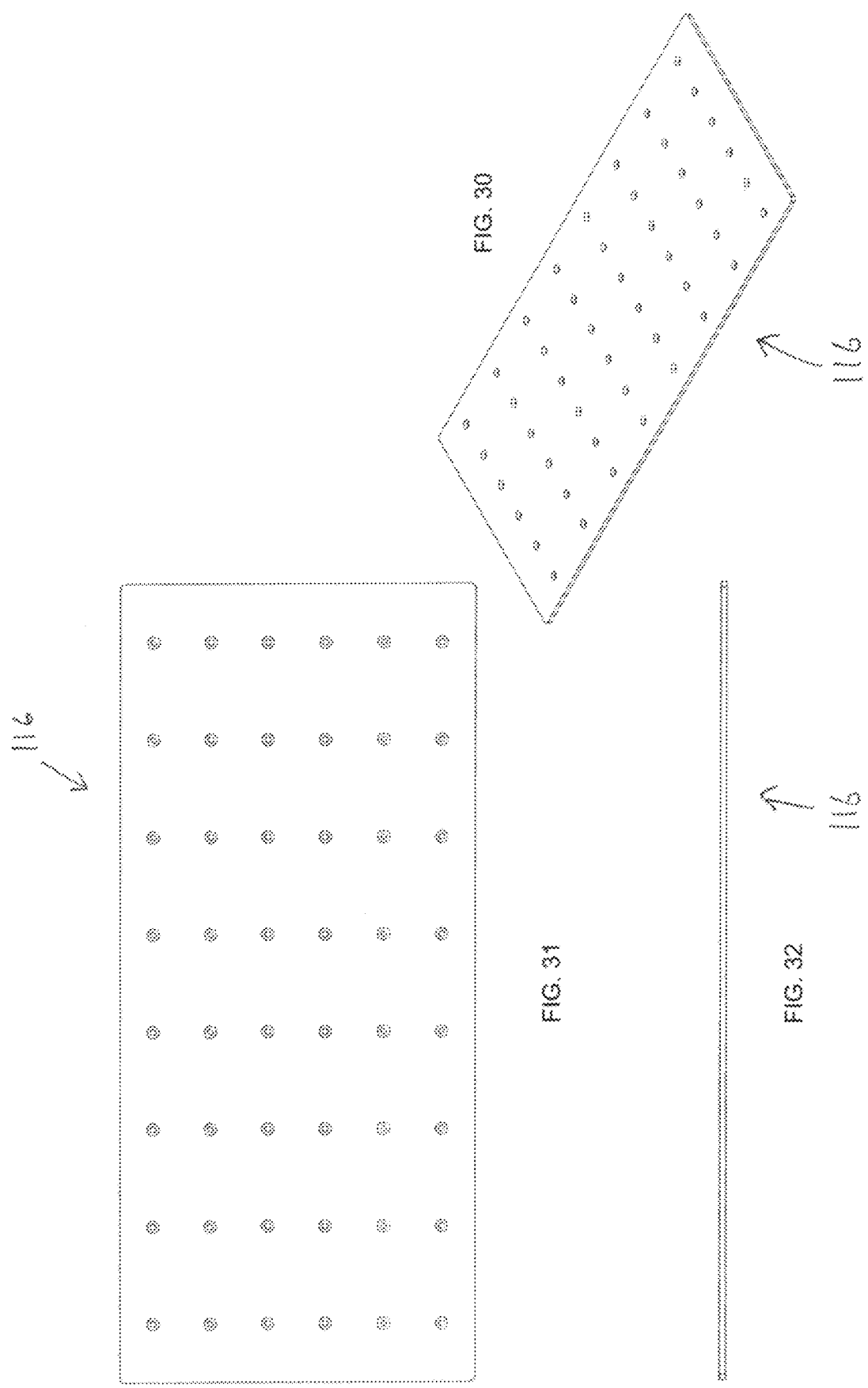

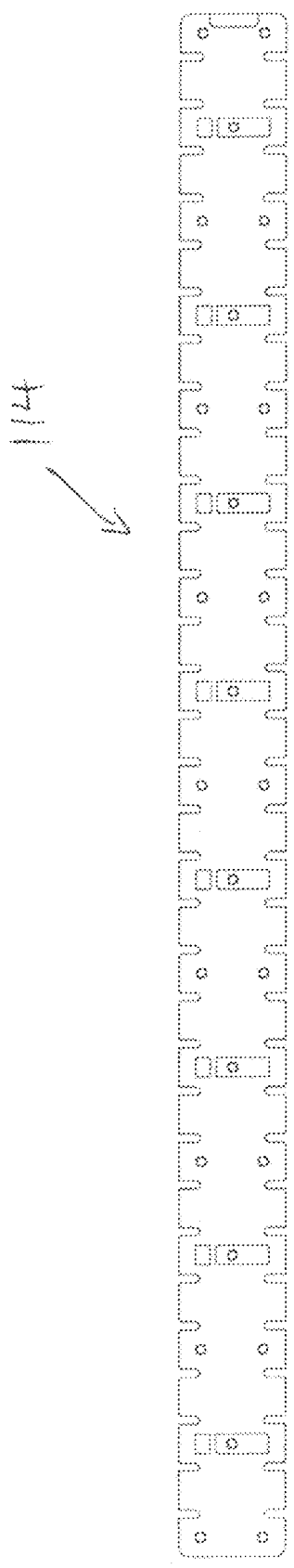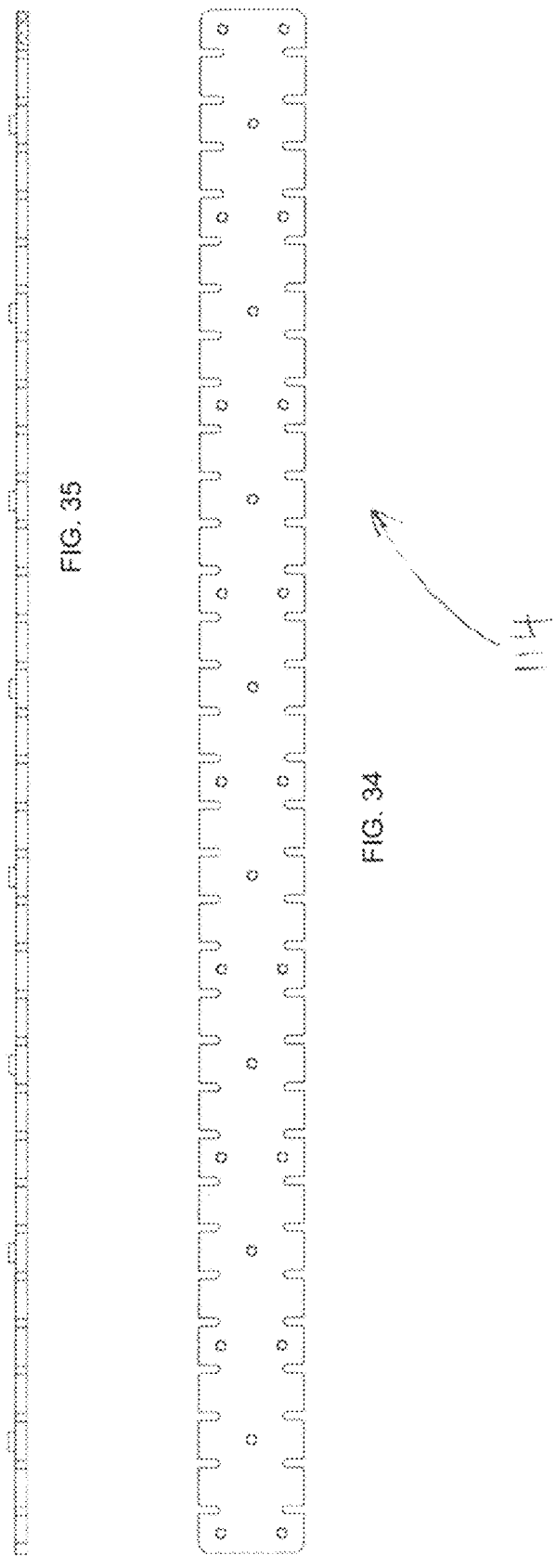
FIG. 33    FIG. 35    FIG. 34

PORTABLE, ELECTRONIC WEIGH SCALE SYSTEM

CROSS-REFERENCE TO RELATED APPLICATIONS, IF ANY

This application claims the benefit under 35 U.S.C. § 119(e) of U.S. Provisional Patent Application Ser. No. 62/669,590, filed May 10, 2018, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to weighing systems, apparatus and methods. Particularly, the invention relates to a low profile weigh scale. Most particularly, the invention relates to a compact, lightweight, portable, and easy to deploy vehicle wheel scale that is useable by law enforcement personnel for commercial vehicle enforcement operations.

2. Background Information

Various state and federal laws, regulations and rules specify the maximum weight of a commercial vehicle load for travel over a particular roadway. Commercial vehicles are commonly weighed at fixed base scale facilities located throughout the various states, most commonly on major highways and other primary road systems. Fixed base scale facilities have stationary scales that are relatively large and durable, but also very sensitive. They can typically weigh either the weight of an entire vehicle, or alternatively the load on an axle, or even a specific wheel. Fixed base scale facilities are commonly operated by law enforcement personnel who are charged with the responsibility for enforcement of vehicle weight laws. Such personnel are typically specialists who handle high volume weight enforcement. Since the facilities require significant infrastructure a limited number of these facilities exist. However, since commercial vehicles travel over all classes of roads, including secondary, tertiary and rural roads on which no weighing facilities exist, the need exist for portable mobile scale systems that can be transported and used by mobile law enforcement personnel who monitor such non-primary motorways. To be portable, the mobile scale systems must be compact and light weight. Due to their smaller size, measurement typically is made of the load on a single wheel, or alternatively single axle using two scale units. Since police officers in squad cars tend to be law enforcement generalists, the mobile scale systems must be easy to deploy, use, and re-store, for example in the trunk of a squad car. They must be useable on a variety of vehicle types, with a variety of loads, on a variety of surfaces, including roadways, roadway shoulders, parking lots, and unfinished (and often uneven) surfaces consisting of gravel, soil, gravel, snow, ice, and the like. They must also be useable in a variety of conditions of temperature, humidity, pressure and the like. Notwithstanding all of these challenges, because mobile weigh scale systems are an instrument of law enforcement, they must be reliable and highly accurate. Lastly, they must be durable so that they withstand repeated cycles of storage, deployment and re storage, all by non-specialized users in a variety of conditions.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a weighing apparatus and method which are practical, reliable, accurate and efficient, and which are believed to fulfill a need and to constitute an improvement over the background technology.

The portable mobile scale system of the present invention is suitable for transport and use by mobile law enforcement personnel who monitor the majority of state and federal motorways. The mobile scale system is compact and light weight. The system is useable by law enforcement generalists. The system is easy to deploy, use, and re-store, for example in the trunk of a squad car. The system is useable on a variety of vehicle types (semi-tractor trailers to smaller trucks), with a variety of loads (from 2,000 to 30000 pounds) on a variety of surfaces including roadways, roadway shoulders, parking lots, and unfinished (and often uneven) surfaces consisting of gravel, soil, gravel, snow, ice, and the like. The system is useable in a variety of conditions of temperature, humidity, pressure and the like. The system is reliable and highly accurate. They are also durable and can withstand repeated cycles of storage, deployment and re-storage, all by non-specialized users in a variety of conditions.

In one aspect, the invention provides an electronic weigh scale, comprising
a base for placement on a surface;
at least one elongated load cell coupled to the base, the load cell having a long axis and a short axis, the at least one load cell being fixedly coupled to the base at two side-by-side lateral points at a first longitudinal position relative to a bottom side of the load cell and fixedly coupled to the base at two side-by-side lateral points at at least one other longitudinal position relative to the bottom side of the load cell; and
a platform coupled to the at least one load cell, the at least one load cell being fixedly coupled to the platform at a second longitudinal position relative to a top side of the at least one load cell and fixedly coupled to the platform at at least one other longitudinal position relative to the top side of the at least one load cell.

In another aspect, the invention provides a compact, self-contained, portable, electronic weigh scale adapted for use for commercial vehicle weight enforcement, comprising
  a. a rigid, metallic, generally rectangular base for placement on a surface, the base having a central recessed area;
  b. a plurality of elongated, rectangular load cells coupled to the base in the central recessed area, the load cells being arranged parallel to each other, each load cell having:
    i. a long axis and a short axis, each load cell being fixedly coupled to the base at two side-by-side lateral points at a first longitudinal position relative to a bottom side of the load cell and fixedly coupled to the base at two side-by-side lateral points at at least one other longitudinal position relative to the bottom side of the load cell;
    ii. wherein the points of coupling of each load cell to the base are not longitudinally aligned with the points of coupling of the load cell to the platform;
    iii. wherein there are more than two longitudinal points of coupling of each load cell and the base, and wherein there are more than two longitudinal points of coupling of the load cell and the platform; and
    iv. wherein each load cell has a plurality of lateral slots disposed on sides of the load cell, the lateral slots defining tabs disposed between each two slots; and wherein each load cell has at least two risers, longitudinally spaced apart from each other and extending from a top of the load cell a predetermined distance. and
  c. a rigid, metallic, rectangular platform coupled to each load cell, the load cells being fixedly coupled to the platform at a second longitudinal position relative to a top side of the load cell and fixedly coupled to the platform at at least one other longitudinal position relative to the top side of the load cells.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 3 a top view of an embodiment of a base of the weigh scale.
FIG. 4 is a cross-sectional view of the base, taken at line 4-4 of FIG. 3.
FIG. 5 is a detailed view of the portion—5—of FIG. 4.
FIG. 6 is a bottom view of the base.
FIG. 7 is a side view thereof, partially in section.
FIG. 11 is a perspective view of an embodiment of a load cell of the weigh scale.
FIG. 12 is a top view of the load cell.
FIG. 13 is a bottom view of the load cell.
FIG. 14 is a side view of the load cell, partially in section.
FIG. 15 is a perspective view of an alternative embodiment of the load cell.
FIG. 16 is a top view of the load cell of FIG. 15.
FIG. 17 is a bottom view thereof.
FIG. 18 is a side view thereof, partially in section.
FIG. 21 a top view of an embodiment of a base of the weigh scale of FIG. 19.
FIG. 22 is a cross-sectional view of the base, taken along line 22-22 of FIG. 21.
FIG. 23 is a cross-sectional view of the base taken along line 23-23 of FIG. 21.
FIG. 24 is a detailed view of portion—24—of FIG. 23.
FIG. 25 is a detailed view of the portion—25—of FIG. 22.
FIG. 26 is a bottom view of the base.
FIG. 27 is an end view thereof.
FIG. 28 is a cross-sectional view thereof, taken at line 28-28 of FIG. 26.
FIG. 29 is a detailed view of area—29—of FIG. 28.
FIG. 30 is a perspective view of an embodiment of a platform of the weigh scale of FIG. 19.
FIG. 31 is a bottom view of the platform.
FIG. 32 is a side view of the platform.
FIG. 33 is a top view of an embodiment of a load cell of the weigh scale of FIG. 19.
FIG. 34 is a bottom view of the load cell.
FIG. 35 is a side view thereof.

DETAILED DESCRIPTION

Figure 1:
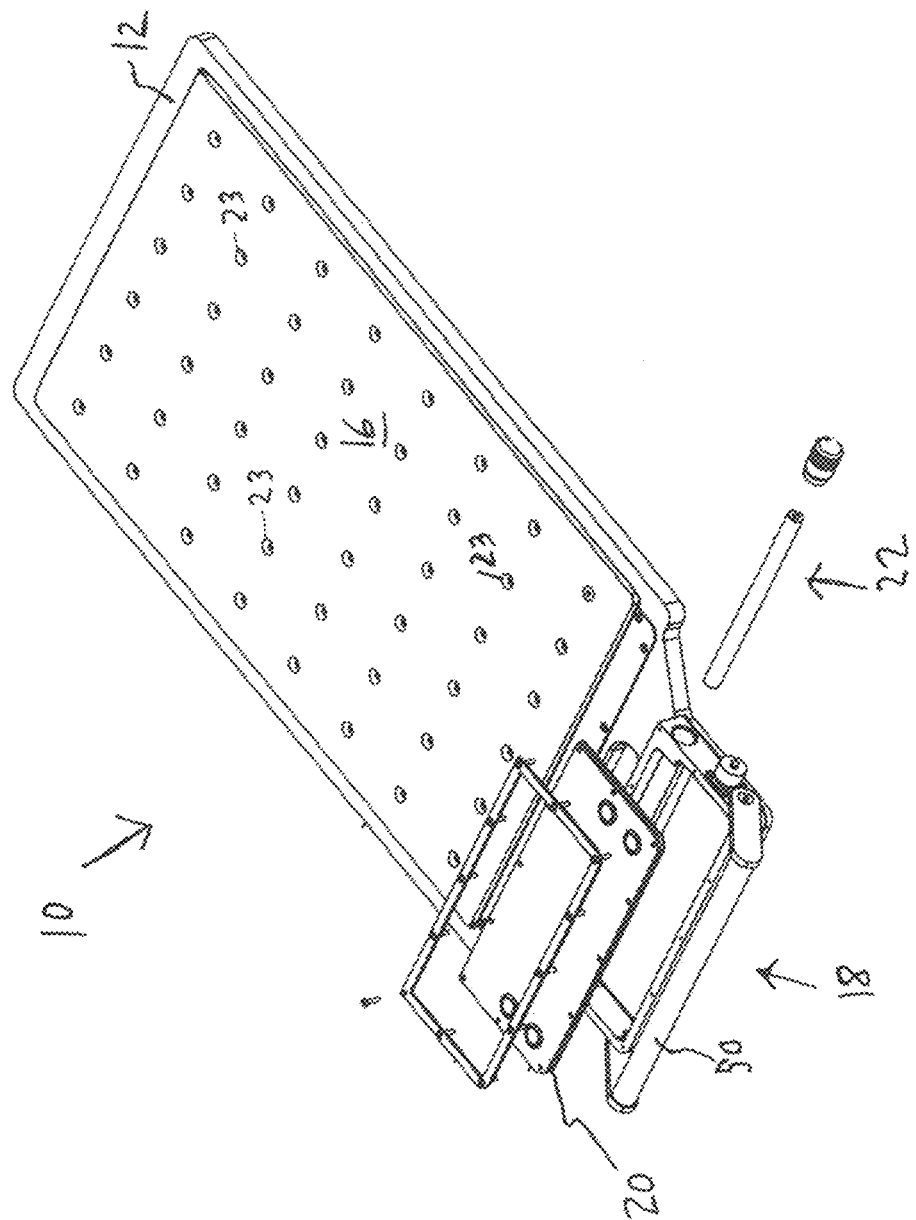
FIG. 1 is a perspective view of an embodiment of a weigh scale of the present invention.
Figure 2:
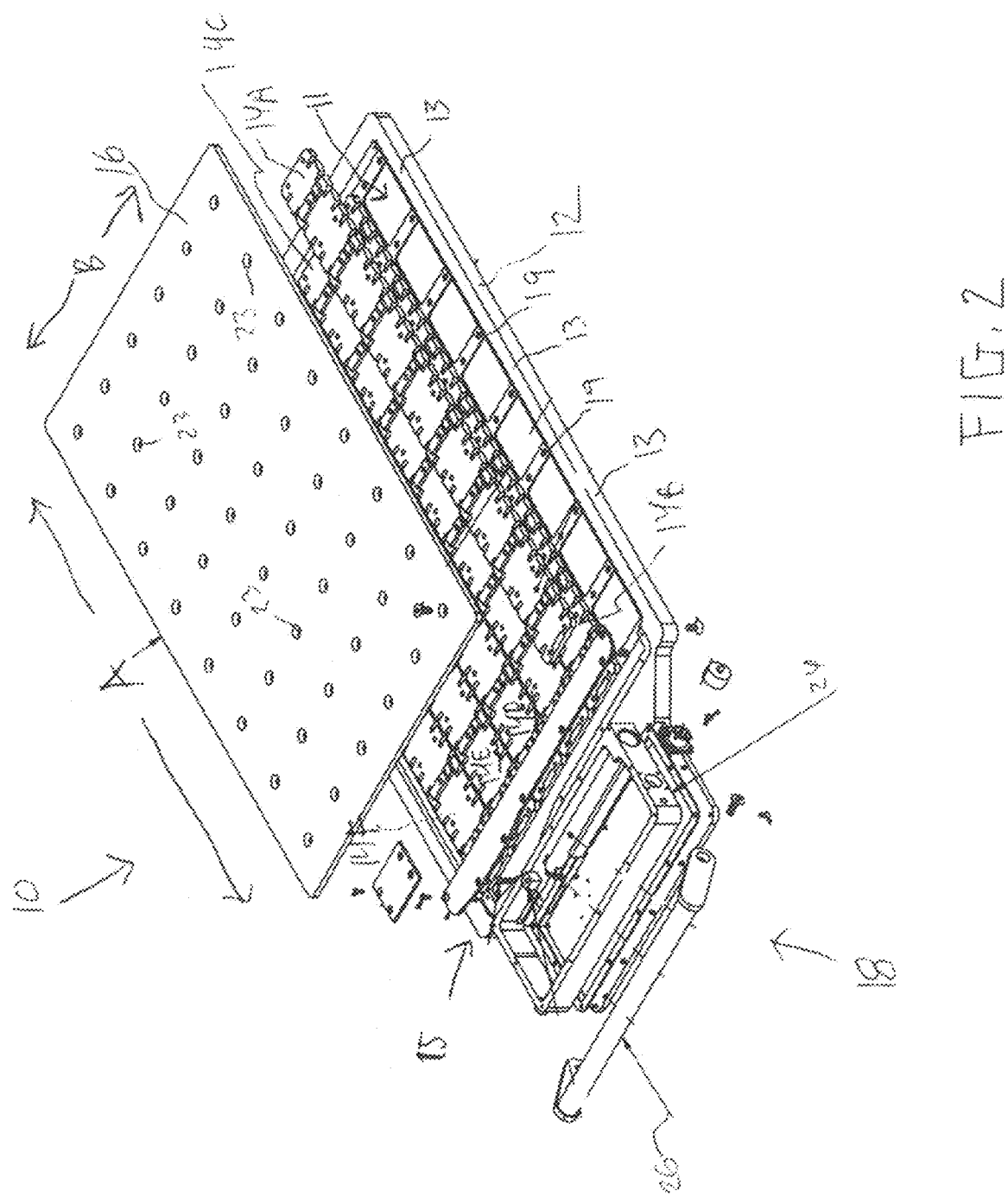
FIG. 2 is an exploded view of the weigh scale.

FIGS. 1 and 2 show an embodiment of a low profile weigh scale 10 of the present invention. The scale 10 is well suited for use in enforcement of commercial vehicle weight (overweight) enforcement laws by weighing wheels, axles, axle groups and entire vehicle weights in a static mode. The scale 10 is also useable for setting up mobile weigh station to weigh multiple vehicles in a dynamic, or weigh in motion (WIM) mode. This is applicable for vehicle weight data collection and for enforcement in some jurisdictions. The scale 10 is optimized for use on roadsides in areas where weight restriction violators typically avoid fixed based weight stations. The scale 10 is highly mobile and portable. It is light in weight and low in profile. In the preferred embodiment, the scale 10 has a weight of only 39 pounds (17 kilograms). It is easy to lift, carry and position. The platform height is 0.85 inches (22 millimeters). This makes the scale 10 easy to move by law enforcement personnel, and easy for vehicle drivers to position the vehicle for weighing. The scale 10 is also self-contained. It is battery powered and has a solar panel that yields are extended period of operation of up to one (1) year with daytime, outdoor use. The scale 10 can weigh wheels, axles, wheel/axle groups and total gross vehicle weight. This data is displayed on the scale via an onboard, easy to read one (1) inch (25 millimeter) LCD (with auto back light) indicator display. The scale 10 also has a cable free, wireless communication feature that permits remote control and transmission of weight data to a remote control/indicator(s) for control, data collection, ticketing and reporting. The scale circuitry does not require an external antenna. Communication is permitted up to 300 feet (90 meters) with a line of sight link.

As best shown in FIG. 2, the scale 10 comprises a base 12, a plurality of load cells 14A-F, a platform 16, and an electronic control assembly 18. The scale 10 has a generally rectangular configuration with a long or longitudinal aspect or axis "A" and a short or lateral aspect or axis "B". The base 12 is also generally rectangular and serves as the bottom member of the assembly and is placed on the surface on which weighing will take place, typically a roadway, road shoulder, parking lot or the like. The plural load cells 14 have an elongated configuration and are disposed on the top surface of the base 12. They are arranged in a side-by-side fashion so that their long axes are oriented parallel to or along the long axis of the base 12. The top surface of the base has a recessed interior portion 11 that is surrounded by an outer rim 13 and is open at its top. The base 12 also has a proximal end portion 15 that serves as the foundation of electronic control assembly 18 components of the scale 10. The load cells 14 are disposed within the recessed portion of the base 12. The platform 16 is also generally rectangular and disposed above the base 12 and load cells 14. The platform 16 is in contact with the load cells 14. The platform 16 is directly contacted by the tires or other wheel elements of the vehicle being weighed. The electronic control assembly 18 incudes a control and indicator circuit board 20 and battery power module 22, both disposed in a housing 24. A handle assembly 26 is coupled to the housing 26.

FIGS. 3-7 show an embodiment of the base 12 of the scale 10. FIG. 3 shows the top side of the base 12 and FIG. 6 shows the bottom side of the base 12. The base 12 is constructed of a rigid metal, preferably 7075-T6 Aluminum. It has a long or longitudinal aspect or axis A' and a short or lateral aspect or axis B'. The base 12 has a rectangular main portion 17 which has the recessed portion 11 and contains the load cells 14. The corners of the base 12 are preferably radiused. Preferred dimensions of the main portion are 26.3 inches long by 17.0 inches wide. Lateral ridges 19 (in this embodiment there are nine (9)) are spaced between the longitudinal ends that are part of the rim 13. The ridges 19 extend upwardly from the floor of the base 12 a predetermined distance. The rim 13 thickness is preferably 0.70 inches. The rows 19 A to I have apertures 21 A to J (in this case there are twelve (12)). Apertures 21 extend through the base 12. As is best shown in FIG. 6, the bottom of the base 12 is flat.

Figure 8:
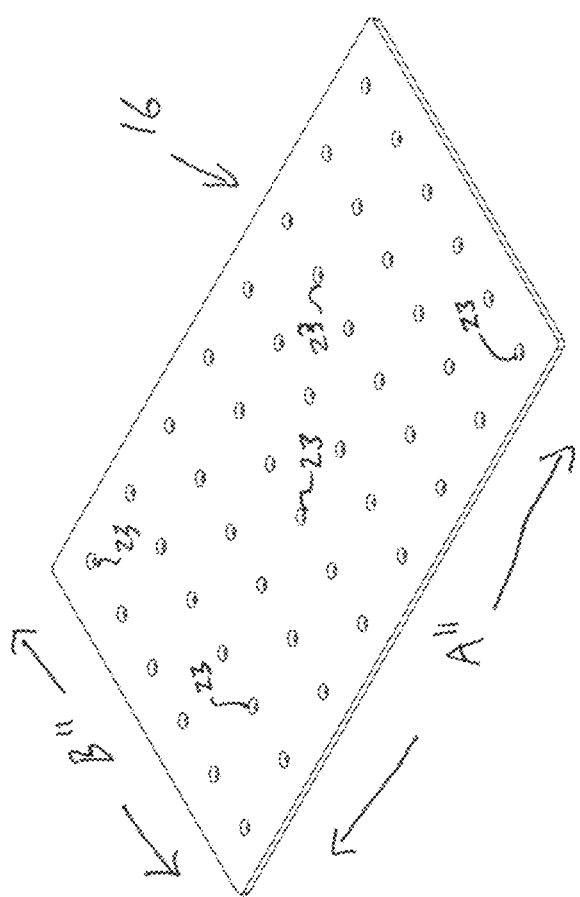
FIG. 8 is a perspective view of an embodiment of a platform of the weigh scale.
Figure 9:
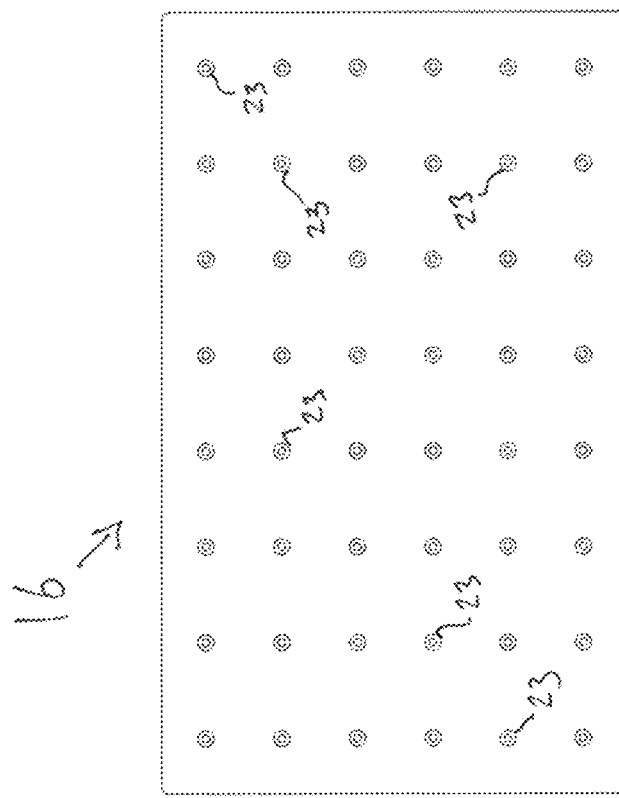
FIG. 9 is a bottom view of the platform.
Figure 10:
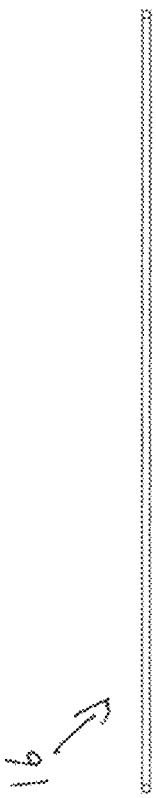
FIG. 10 is a side view of the platform.

FIGS. 8-10 are isometric (top), bottom and side views, respectively, an embodiment of the platform 16 of the scale 10. The platform 16 is also constructed of a rigid metal, and preferably 7075-T6 Aluminum. It also has a long or longitudinal aspect or axis A" and a short or lateral aspect or axis B". The platform 16 has a rectangular configuration with dimensions coextensive with the recessed portion 11 whereby it fits with the rim 13. Preferred dimensions are 26.0 inches in length and 15.5 inches in width. Its corners are preferably radiused. The platform 16 has a preferred thickness of 0.25 inches. When operatively placed, the platform 16 is coplanar with the top of the rim 13. The operative arrangement of the platform 16 with the base 12 forms an enclosure which is peripherally defined by the recess 17. Platform 16 has apertures 23 that are aligned with apertures 21 of the base 12 when operatively aligned.

FIGS. 11-44 are isometric, top, side and bottom views, respectively, of a first embodiment of a load cell 14A-E of the scale 10. FIGS. 11 and 12 show the top side of the load cell 14. FIG. 13 shows the bottom side of the load cell 14. In the preferred embodiment, there are six (6) load cells 14.

Each load cell 14 is constructed of 2024-T361 Aluminum. The load cell 14 has an elongated, flat and thin configuration. Each load cell 14 has a long or longitudinal aspect or axis A'" and a short or lateral aspect or axis B'". Preferred dimensions are 26.0 inches long, 2.4 inches wide, and 0.23 inches thick. Sits four corners are preferably radiused. Generally U-shaped slots 25 are formed and uniformly spaces in the long sides of the load cell 14. This arrangement forms uniformly spaced lateral tabs 27 in the long sides. In the preferred embodiment, the slots are formed every 0.64 inches. A pair of tandem spaced body apertures 29 (8×¼-20 UNC) are disposed in the load cell 14 beginning at the proximal end and spaced and aligned with every other tab 27. The apertures 29 are oriented so that they are in the center region of the load cell (which in this embodiment has a width of 1.463 inches) and do not extend into the tabs 27. In the preferred embodiment, the apertures 29 of each pair are spaced 1.45 inches from each other, measured on center. The apertures 29 are threaded, and when the load cell 14 is operatively placed in position in the based 12, apertures 29 are aligned with base apertures 21. Fasteners, preferably flat head screws, are placed in the aperture sets 21/29 to secure the load cell 14 to the base 12. Vertical tabs or risers 31 extend upwardly from the top surface of the load cell 14. The risers 31 are evenly spaced beginning at the third tabs 27 from the proximal end and placed every $4^{th}$ tab towards the distal end. In the preferred embodiment, this yields eight (8) risers. Risers 31 have a height, measured from the top surface of the load cell 14, of 0.175 inches. In the preferred embodiment, each riser consists of a pair of risers including a major riser 31A and a minor riser 31B. A threaded riser aperture 33 is disposed on each riser 31. When the load cell 14 is operatively placed in position on the base, and the platform 16 is operatively disposed on top of the load cells 14, apertures 33 are aligned with the platform apertures 23. Fasteners, preferably flat head screws, are placed in the aperture sets 23/33 to secure the load cell 14 to the platform 16.

Returning to FIG. 2, in the assembled scale 10, the lead cells 14 are oriented in a side-by-side fashion so that their long axes'" are parallel to each other. The body apertures 29 of each load cell 14 is aligned, laterally, with the body apertures 29 of its adjacent load cells 14 whereby the body apertures 29 of all of the load cells 14 form lateral rows. The risers 31 and riser apertures 33 of each load cell 14 is aligned with the risers 31 and riser apertures 33 of its adjacent load cells 14 wherein the risers 31 and riser apertures 33 of all of the load cells 14 also form lateral rows. The slots 25 and tabs 27 of adjacent load cells 14 are also aligned laterally. During use, the vehicle load contacts the broad area of platform 16 whereby force from the load is translated downwardly to the plural, side-by-side load cells 14 coupled to the platform 16, which in turn are fixed in place to the base 12. This causes the load cells 14 to be strained. Each load cell 14 has a plurality of resistive strain gauges which are themselves strained. An electrical current passing through the strain gauges undergoes a resistive change that is proportional to the load. The system is calibrated to permit calculation of the true weight of the load.

FIGS. 15-18 show an alternative embodiment of a load cell 14X of the scale 10. In this embodiment, the scale 10 dimensions are 26 inches (660 mm.) long, 15.5 inches (394 mm.) wide, and 0.85 inches (22 mm.) in height. The scale 10 has a load capacity (per scale) of 30,000 pounds (15,000 Kg) or 15 tons. The scale 10 operates at temperatures between −20 to 150 F (−28 to 65 C).

Figure 19:
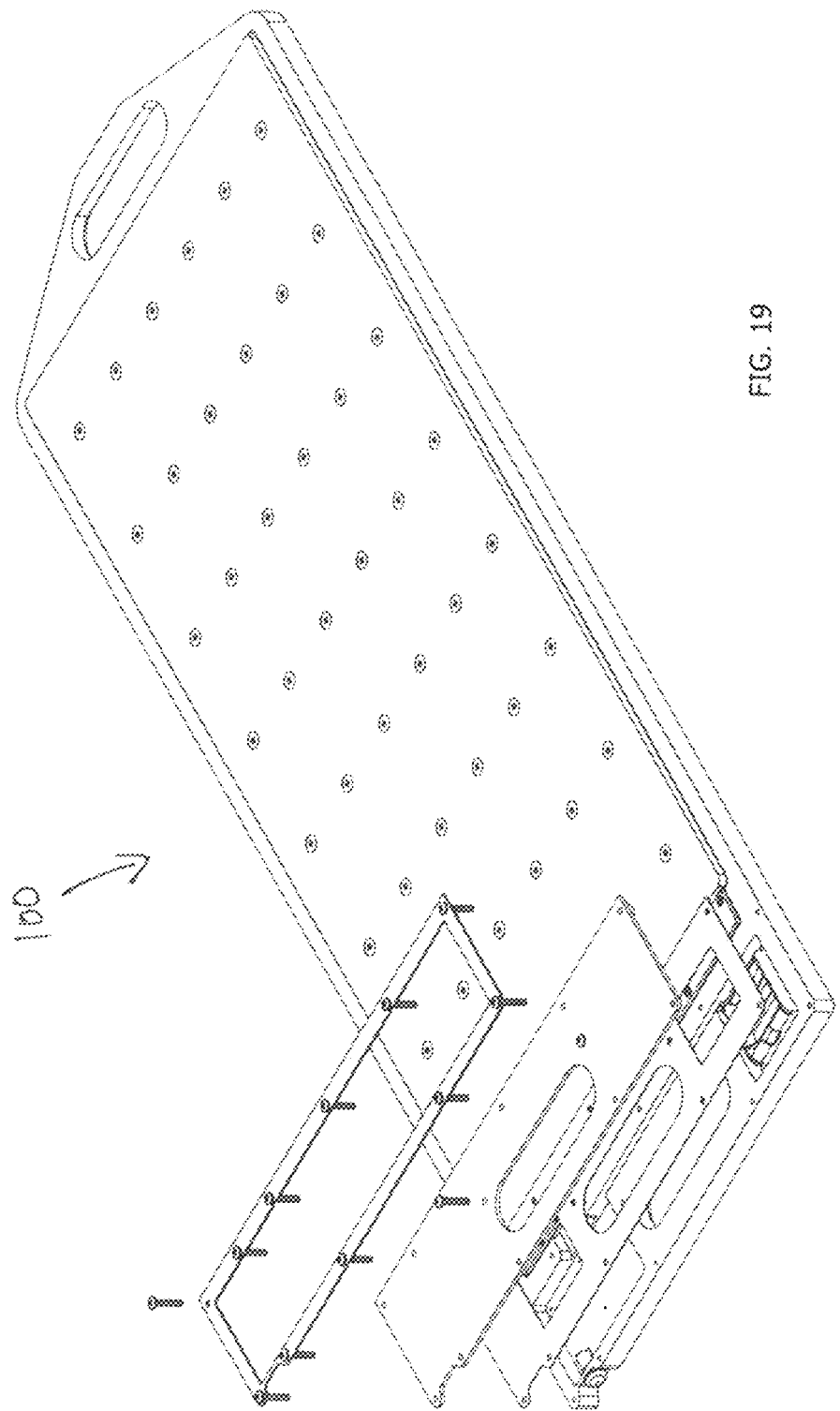
FIG. 19 is a perspective view of an alternative embodiment of a weigh scale of the present invention.
Figure 20:
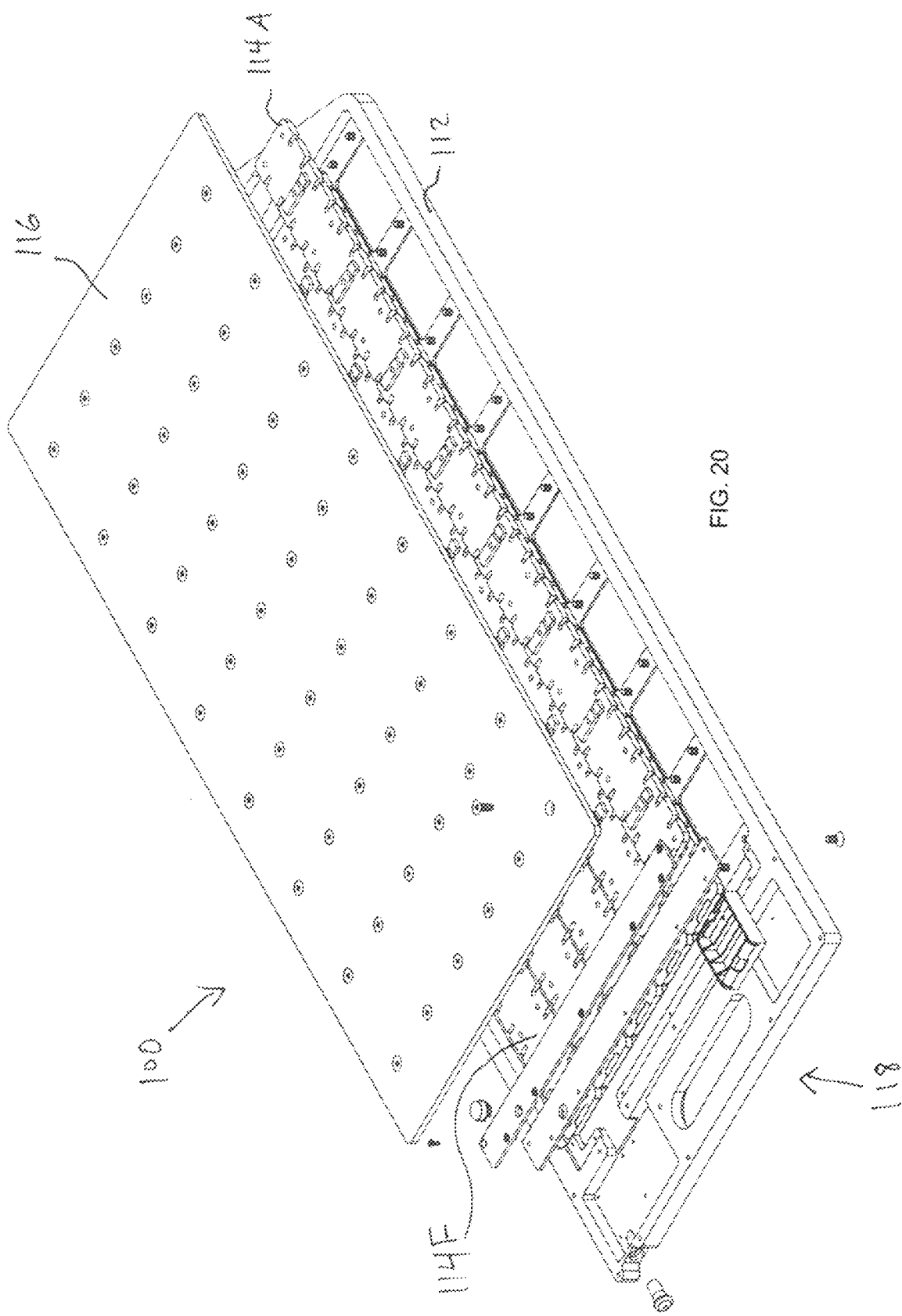
FIG. 20 is an exploded view of the weigh scale of FIG. 19.

FIGS. 19 and 20 show an alternative embodiment of a low profile weigh scale 100 of the present invention. As best shown in FIG. 20, the scale 100 comprises a base 112, a plurality of load cells 114A-F, a platform 116, and an electronic control assembly 118. The electronic control assembly 118 includes a control and indicator circuit hoard and battery power module, both disposed in a housing. A handle is integrated therewith.

FIGS. 21-29 show an embodiment of the base 112 of the scale 100. FIGS. 30-32 show an embodiment of the platform 116 of the scale 100. FIGS. 33-35 show an embodiment of a load cell 114A-F of the scale 100.

Figure 39:
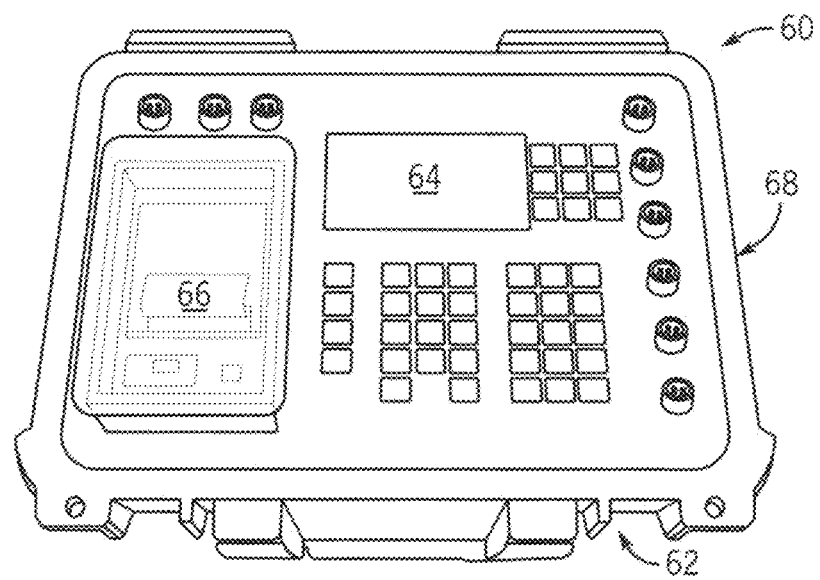
FIG. 39 shows an embodiment of a controller for use with the scale systems of the invention.

FIG. 39 shows an embodiment of a controller for use with the scale systems of the invention. The controller 60 has a control panel 62, a backlit LCD indicator 64, a self-contained printer 66, and a plurality of USB and RS232 electronic connection ports 68. These components are communicatively connected to a central processor and a power supply (preferably standard D-cell batteries). The controller 60 has an RF wireless transmitter/receiver. These components are enclosed within a portable hardened case. The controller 60 communicates with up to twelve (12) scales up to 300 feet (90 meters) distance—line of sight. The CPU processes weight data for monitoring and control of loads. Weight data include a scale layout or scale list with weight units, total weight, center of gravity, Gross, Net, Tare (GNT), altitude and latitude/longitude. System software allows for four optional user information fields, and seven optional vehicle information fields. Software also permits import/export, print and save for records. Weigh In Motion functions include vehicle class, gross vehicle weight, axle weight, and data storage while producing an array of reports for record keeping and data analysis. Actual weights can be compared to legal limits for enforcement purposes, as well as generating tickets on site.

Figure 36:
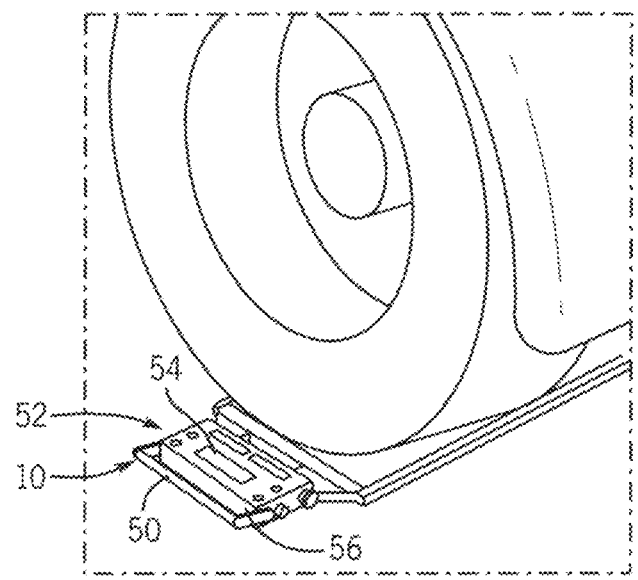
FIG. 36 illustrates the scale of the invention in use to weigh a wheel or wheel axle set in a static, non-moving mode.

FIG. 36 illustrates the scale 10 in a standard, static mode for commercial vehicle weight enforcement. The scale 10 is placed on a base surface and a single vehicle tire is rolled on top of it. A pair of scales 10 A and B may be spaced apart for weighing both wheels of an axle. The self-contained, 12V, DC battery powered, electronic scale 10 has a handle 50, a control panel 52, an indicator 54, and a solar panel 56. The handle 50 facilitates lifting from storage in a vehicle trunk or deployment on the ground, carrying, and positioning or re-storage. The control panel 52 has On/Off, Zero, Local/Total, and Print/Accumulate buttons. Zero function is preferably automatic zero tracking (AZT) with the semi-automatic zero setting button. The scale 10 can weigh wheels, axles, wheel/axle groups and total gross vehicle weight. This data is displayed on the scale via the onboard, easy to read one (1) inch (25 millimeter) Liquid Crystal Display (LCD) Alphanumeric indicator/display 54. The display 54 also preferably has an auto back light. The indicator 54 further has Low Battery, Lb./Kg, Local and Total indicator cells. The scale 10 has a 12VDC power connection for direct power and battery recharging. However, the solar panel 56 recharges the batteries automatically and yields an extended period of operation of up to one (1) year with daytime, outdoor use. The scale 10 also has a cable free, wireless radio frequency (RF) communication feature that permits remote control and transmission of weight data to a remote controller/indicator(s) for control, data collection, ticketing and reporting. The scale circuitry does not require an external antenna. Communication is permitted up to 300 feet (90 meters) with a line of sight link. The scale 10 further has an RS-485 communication port for cable communication when desired.

Figure 37:
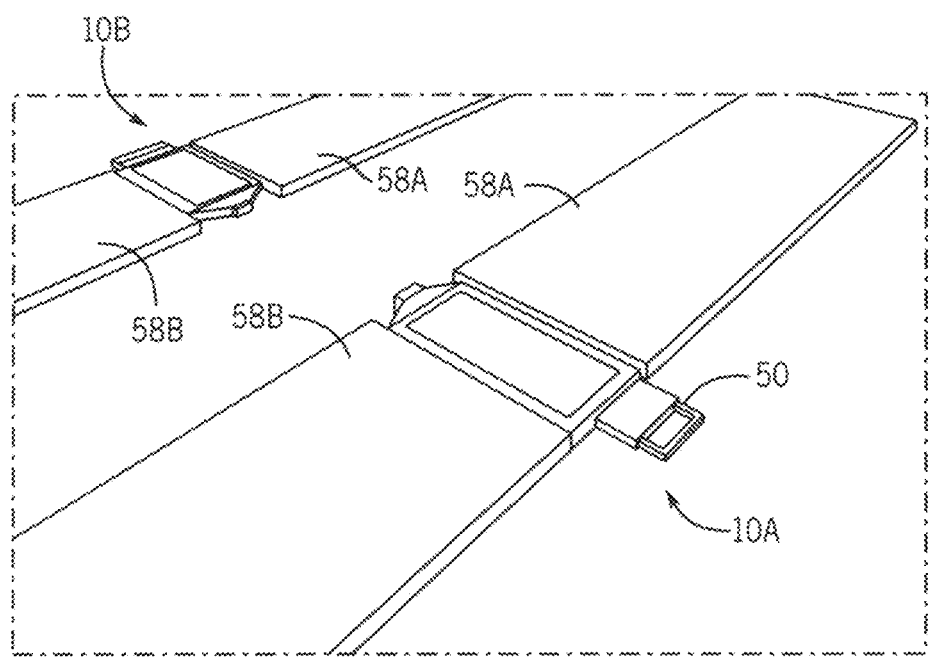
FIG. 37 illustrates an embodiment of a scale system of the invention comprising a pair of scales and a ramp assembly for use in either static mode or a dynamic, weigh in motion mode.
Figure 38:
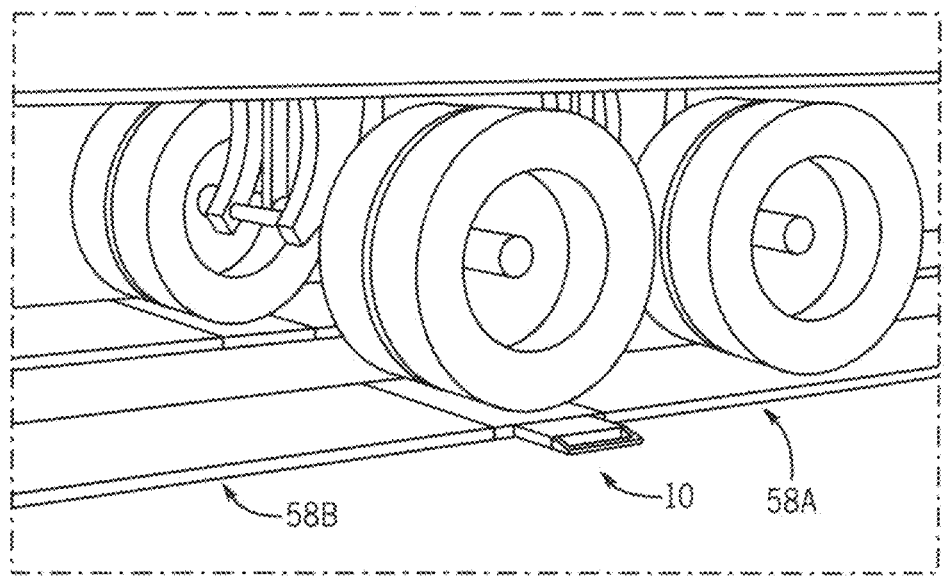
FIG. 38 illustrates a commercial vehicle being weighed according to a method of use of the scale system of FIG. 37.

FIGS. 37 and 38 illustrate an embodiment of a system and method of use of the Scale system for Weigh In Motion (WIM) weighing. In the US, states must meet a federal requirement to collect commercial vehicle data and report back with this information. By deploying mobile, portable scale systems, state and local law enforcement personnel can capture weight data for federal compliance, and also use them for overweight enforcement. Portability for ease of setup, WIM capability for vehicle screening, NTEP certification for ticketing, and wireless communication for operation at a distance to maintain officer safety are among the scale's advantages. The scales are operable in WIM mode for screening vehicles, weighing several vehicles per minute and capturing over a hundred vehicle records per hour. The system's controller accumulates and displays axle and Gross Vehicle Weights (GVW) for an onboard printer, or for saving vehicle records to export via a USB port. Communication between the scales and indicator is done wirelessly, allowing cable-free operation at a safe distance (up to 300 ft.) from the active weighing zone. As shown in FIG. 46, the weighing system consists of two scales 10 A and B, deployable ramps 58 A and B, levelers, and a wireless indicator. The system can be set up for use in less than 10 minutes for operation as a portable weigh station, minimizing both officers' time and the opportunity for vehicle operators to circumvent the rapidly deployed mobile weigh station. Scales have integrated antennas for communication, eliminating external antennas which can be damaged during weighing's. The scales are oversized to accommodate super-single and dual-tire wheels, with ramps maintaining adjacent axle groups on level with one another, and make it easier for vehicles to drive onto and off the scales. Due to its portability, certified accuracy, and versatility of operation in WIM and static modes, the portable Weigh-In-Motion scale system is useable worldwide for vehicle screening and enforcement applications.

In summary, the portable mobile scale system is suitable for transport and use by mobile law enforcement personnel who monitor the majority of municipal, county, state and federal motorways. The mobile scale system is compact and light weight. The system is useable by law enforcement generalists. The system is easy to deploy, use, and re-store, for example in the trunk of a squad car. The system is useable on a variety of vehicle types (semi-tractor trailers to smaller trucks), with a variety of loads (from 2,000 to 30,000 pounds) on a variety of surfaces including roadways, roadway shoulders, parking lots, and unfinished (and often uneven) surfaces consisting of gravel, soil, snow, ice, and the like. The system is useable in a variety of conditions of temperature, humidity, pressure and the like. The system is reliable and highly accurate. It is also durable and eat withstand repeated cycles of storage, deployment and re-storage, all by non-specialized users in a variety of conditions.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An electronic weigh scale, comprising
a base for placement on a surface;
at least one elongated load cell coupled to the base, the load cell having a long axis and a short axis, the at least one load cell being fixedly coupled to the base at two side-by-side lateral points at a first longitudinal position relative to a bottom side of the load cell and fixedly coupled to the base at two side-by-side lateral points one or more other longitudinal positions relative to the bottom side of the load cell;
wherein the at least one load cell has a plurality of lateral slots disposed on sides of the load cell, the lateral slots defining tabs disposed between each two slots;
wherein the lateral slots extend inwardly a redetermined distance defining a central longitudinally oriented beam area, the load cell being fixedly coupled to both the base and the platform in the beam area; and
a platform coupled to the at least one load cell, the at least one load cell being fixedly coupled to the platform at a second longitudinal position relative to a top side of the at least one load cell and fixedly coupled to the platform at the at least one other longitudinal position relative to the top side of the at least one load cell.

2. The electronic weigh scale of claim 1, wherein the first longitudinal position relative to the bottom side of the load cell is not longitudinally aligned with the second longitudinal position relative to the top side of the load cell.

3. The electronic weigh scale of claim 1, wherein there are plural load cells arranged parallel to each other.

4. The electronic weigh scale of claim 3, wherein the base has a plurality of lateral ridges wherein the points of coupling between each load cell and the base are disposed on a lateral ridge.

5. The electronic weigh scale of claim 1, wherein the at least one load cell has at least two risers, longitudinally spaced apart from each other and extending from a top of the load cell a predetermined distance.

6. The electronic weigh scale of claim 1, wherein there are plural load cells arranged parallel to each other; wherein the at least one load cell has a plurality of lateral slots disposed on sides of the load cell, the lateral slots defining tabs disposed between each two slots; and wherein the at least one load cell has at least two risers, longitudinally spaced apart from each other and extending from a top of the load cell a predetermined distance.

7. The electronic weigh scale of claim 1, wherein the base is constructed of a rigid metallic material, has a generally rectangular configuration, and a central recessed area.

8. The electronic weigh scale of claim 1, wherein the platform is constructed of a rigid metallic material and has a rectangular configuration.

9. The electronic weigh scale of claim 1, wherein the load cells are constructed of a metallic substance that is less rigid than the material from which the base and the platform are constructed.

10. The electronic weigh scale of claim 1, wherein the load cell is fixedly coupled to the base and to the platform via screws.

11. An electronic weigh scale, comprising
a. a rigid, generally rectangular base for placement on a surface;
b. a plurality of elongated, rectangular load cells coupled to the base, the load cells being arranged parallel to each other, each load cell having a long axis and a short axis, each load cell being fixedly coupled to the base at two side-by-side lateral points at a first longitudinal position relative to a bottom side of the load cell and fixedly coupled to the base at two side-by-side lateral points at one or more other longitudinal positions relative to the bottom side of the load cell, wherein:
the at least one load cell has a plurality of lateral slots disposed on sides of the load cell, the lateral slots defining tabs disposed between each two slots; and
the lateral slots extend inwardly a predetermined distance defining a central longitudinally oriented beam area the load cell being fixedly coupled to both the base and the platform in the beam area; and
c. a rigid, rectangular platform coupled to each load cell, the load cells being fixedly coupled to the platform at a second longitudinal position relative to a top side of the load cell and fixedly coupled to the platform at the at least one other longitudinal position relative to the top side of the load cells.

12. A compact, self-contained, portable, electronic weigh scale adapted for use for commercial vehicle weight enforcement, comprising
a. a rigid, metallic, generally rectangular base for placement on a surface, the base having a central recessed area;
b. a plurality of elongated, rectangular load cells coupled to the base in the central recessed area, the load cells being arranged parallel to each other, each load cell having:
  i. a long axis and a short axis, each load cell being fixedly coupled to the base at two side-by-side lateral points at a first longitudinal position relative to a bottom side of the load cell and fixedly coupled to the base at two side-by-side lateral points at one or more other longitudinal positions relative to the bottom side of the load cell; and
  ii wherein each load cell has a plurality of lateral slots disposed on sides of the load cell, the lateral slots defining tabs disposed between each two slots, wherein the lateral slots extend inwardly a predetermined distance defining a central longitudinally oriented beam area, the load cell being fixedly coupled to both the base and the platform in the beam area; and wherein each load cell has at least two risers, longitudinally spaced apart Rom each other and extending from a top of the load cell a predetermined distance, and
c. a rigid, metallic, rectangular platform coupled to each load cell, the load cells being fixedly coupled to the platform at a second longitudinal position relative to a top side of the load cell and fixedly coupled to the platform at the at least one other longitudinal position relative to the top side of the load cells.

13. An electronic weigh scale, comprising
a base for placement on a surface;
at least one elongated load cell coupled to the base, the load cell having a long axis and a short axis, the at least one load cell being fixedly coupled to the base at two side-by-side lateral points at a first longitudinal position relative to a bottom side of the load cell and fixedly coupled to the base at two side-by-side lateral points at at least one other longitudinal position relative to the bottom side of the load cell;

wherein there are plural load cells arranged parallel to each other wherein the at least one load cell has a plurality of lateral slots disposed on sides of the load cell the lateral slots defining tabs disposed between each two slots; and wherein the at least one load cell has at least two risers, longitudinally spaced apart from each other and extending from a top of the load cell a predetermined distance; and a platform coupled to the at least one load cell, the at least one load cell being fixedly coupled to the platform at a second longitudinal position relative to a top side of the at least one load cell and fixedly coupled to the platform at the at least one other longitudinal position relative to the top side of the at least one load cell.

\* \* \* \* \*